United States Patent
Palmer

(10) Patent No.: US 10,761,725 B2
(45) Date of Patent: Sep. 1, 2020

(54) WRITE COMMAND OVERLAP DETECTION

(71) Applicant: Micron Technology, Inc., Boise, ID (US)

(72) Inventor: David A. Palmer, Boise, ID (US)

(73) Assignee: Micron Technology, Inc., Boise, ID (US)

(*) Notice: Subject to any disclaimer, the term of this patent is extended or adjusted under 35 U.S.C. 154(b) by 58 days.

(21) Appl. No.: 15/906,315

(22) Filed: Feb. 27, 2018

(65) Prior Publication Data
US 2018/0188965 A1 Jul. 5, 2018

Related U.S. Application Data

(63) Continuation of application No. 14/819,652, filed on Aug. 6, 2015, now Pat. No. 9,916,089, which is a continuation of application No. 13/469,429, filed on May 11, 2012, now Pat. No. 9,116,625.

(51) Int. Cl.
*G06F 3/06* (2006.01)

(52) U.S. Cl.
CPC .......... *G06F 3/0604* (2013.01); *G06F 3/0619* (2013.01); *G06F 3/0659* (2013.01); *G06F 3/0673* (2013.01); *G06F 3/0688* (2013.01)

(58) Field of Classification Search
CPC .... G06F 3/0604; G06F 3/0619; G06F 3/0659; G06F 3/0673; G06F 3/0688
See application file for complete search history.

(56) References Cited

U.S. PATENT DOCUMENTS

| | | | |
|---|---|---|---|
| 5,687,183 A | 11/1997 | Chesley | |
| 6,320,848 B1* | 11/2001 | Edwards | H04L 43/00 370/255 |
| 6,374,266 B1 | 4/2002 | Shnelvar | |
| 6,490,635 B1 | 12/2002 | Holmes | |
| 6,839,773 B2 | 1/2005 | Vishlitzky et al. | |
| 6,957,297 B1 | 10/2005 | Cleveland et al. | |
| 7,058,760 B2 | 6/2006 | Ohta et al. | |
| 7,334,069 B2* | 2/2008 | Araki | G06F 9/5016 710/36 |
| 8,032,561 B1* | 10/2011 | Nadj | G06F 7/22 707/799 |
| 8,051,335 B1* | 11/2011 | Reimers | G06F 3/061 714/43 |
| 2004/0059855 A1 | 3/2004 | Yang et al. | |
| 2005/0198447 A1* | 9/2005 | Corrado | G06F 16/9027 711/152 |
| 2006/0047902 A1* | 3/2006 | Passerini | G06F 3/0611 711/114 |

(Continued)

*Primary Examiner* — Nanci N Wong
(74) *Attorney, Agent, or Firm* — Brooks, Cameron & Huebsch, PLLC

(57) ABSTRACT

The present disclosure includes methods and apparatuses that include write command overlap detection. A number of embodiments include receiving an incoming write command and comparing a logical address of the incoming write command to logical addresses of a number of write commands in a queue using a tree data structure, wherein a starting logical address and/or an ending logical address of the incoming write command and a starting logical address and/or an ending logical address of each of the number of write commands are associated with nodes in the tree data structure.

20 Claims, 3 Drawing Sheets

(56) References Cited

U.S. PATENT DOCUMENTS

| | | | |
|---|---|---|---|
| 2007/0169010 A1* | 7/2007 | Garner | G06F 8/10 |
| | | | 717/136 |
| 2008/0104259 A1 | 5/2008 | LeFevre et al. | |
| 2011/0099342 A1 | 4/2011 | Ozdemir | |
| 2011/0161552 A1 | 6/2011 | Lund et al. | |
| 2011/0208933 A1* | 8/2011 | Selfin | G06F 11/108 |
| | | | 711/162 |
| 2012/0117112 A1* | 5/2012 | Johnston | G06F 16/9537 |
| | | | 707/771 |
| 2012/0198167 A1* | 8/2012 | Guthrie | G06F 9/30087 |
| | | | 711/122 |
| 2012/0311613 A1* | 12/2012 | Mikkelsen | H04L 47/24 |
| | | | 719/328 |
| 2013/0173665 A1* | 7/2013 | Colena | G06F 3/0488 |
| | | | 707/797 |

* cited by examiner

| | COMMAND | LA |
|---|---|---|
| 234-1 | COMMAND 1 | 16-23 |
| 234-2 | COMMAND 2 | 41-47 |
| 234-3 | COMMAND 3 | 0-7 |
| 234-4 | COMMAND 4 | 33 |

WRITE COMMAND OVERLAP DETECTION

This application is a Continuation of U.S. application Ser. No. 14/819,652, filed Aug. 6, 2015, which issues as U.S. Pat. No. 9,916,089 on Mar. 13, 2018, which is a Continuation of U.S. application Ser. No. 13/469,429 filed on May 11, 2012, which issued as U.S. Pat. No. 9,116,625 on Aug. 25, 2015, the contents of which are included herein by reference.

TECHNICAL FIELD

The present disclosure relates generally to semiconductor memory and methods, and more particularly, to apparatuses and operation methods associated with write command overlap detection.

BACKGROUND

Memory devices are typically provided as internal, semiconductor, integrated circuits in computers or other electronic devices. There are many different types of memory including volatile and non-volatile memory. Volatile memory can require power to maintain its information (e.g., data, error information, etc.) and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory devices can be combined together to form a storage volume of a memory system, such as a solid state drive (SSD). A solid state drive can include non-volatile memory (e.g., NAND flash memory and/or NOR flash memory), and/or can include volatile memory (e.g., DRAM and SRAM), among various other types of non-volatile and volatile memory.

An SSD can be used to replace hard disk drives as the main storage volume for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electro-mechanical delays associated with magnetic disk drives. SSD manufacturers can use non-volatile flash memory to create flash SSDs that may not use an internal battery supply, thus allowing the drive to be more versatile and compact.

Memory systems, such as SSDs, can receive commands from a host in association with memory operations, such as read and write operations, to transfer data (e.g., between the memory devices and the host) and it can be beneficial for the memory system to execute memory operations in parallel. However, due to differences in the data transfer size of a host and the data transfer size of a memory system, for instance, parallel write commands received by a memory system can have overlapping logical addresses. Parallel processing of write commands having overlapping logical addresses can lead to errors when writing data to memory, which can compromise data integrity of the memory system.

DETAILED DESCRIPTION

Figure 1:
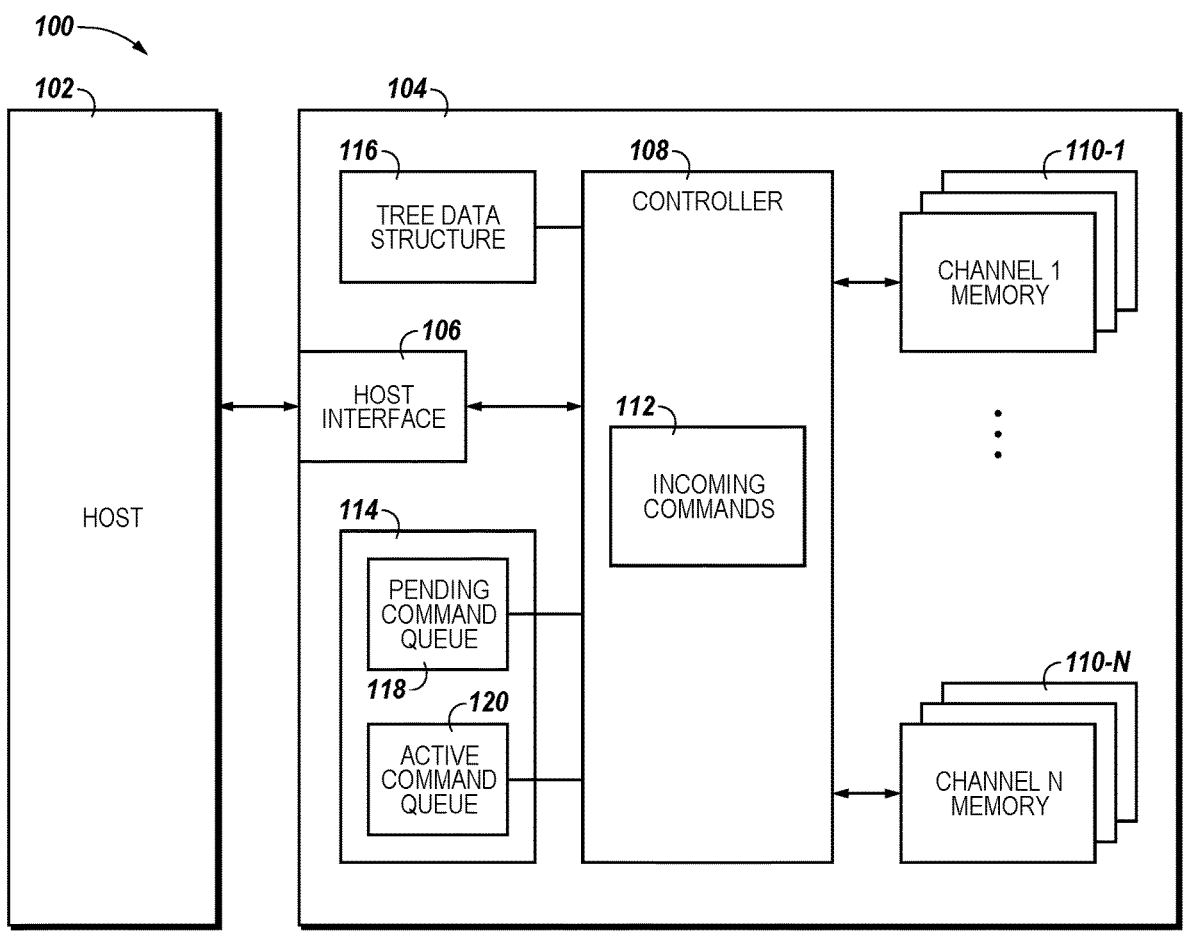
FIG. 1 is a block diagram of an apparatus in the form of a computing system including at least one memory system in accordance with a number of embodiments of the present disclosure

The present disclosure includes methods and apparatuses that include write command overlap detection. A number of embodiments include receiving an incoming write command and comparing a logical address of the incoming write command to logical addresses of a number of write commands in a queue using a tree data structure, wherein a starting logical address and/or an ending logical address of the incoming write command and a starting logical address and/or an ending logical address of each of the number of write commands are associated with nodes in the tree data structure.

In a number of embodiments, write commands sent from a host to an apparatus can include logical addresses that overlap, (e.g., two or more write commands are associated with at least one common logical address). Write commands having overlapping logical addresses can cause errors when executing such write commands in parallel. Therefore it can be beneficial to detect write commands that have overlapping logical addresses before executing those commands. In some previous approaches, hardware was used to detect overlap and/or each incoming write command was compared linearly with each of the write commands in the active write command queue. Linear comparisons of each write command can be a computationally intensive process and can include making $n^2$ comparisons, where n is the number of commands in the active command queue.

In a number of embodiments of the present disclosure, a tree data structure can be used to detect overlap of write commands. As an example, the tree data structure can be created using firmware when the number of write commands in the write command queue reaches a threshold. The threshold number of write commands can be determined, for example, based on the point at which the number of comparisons for detecting overlap using a tree data structure is less than the number of comparisons for detecting overlap using a linear comparison method (e.g., the point at which using a tree data structure for detecting overlap is less computationally intensive than using a linear comparison method). For example, detecting overlap using a tree data structure can include making n log n comparisons, while a linear comparison method can include making $n^2$ comparisons. Also, the use of tree data structure for detecting overlap can be discontinued (e.g., the tree data structure may be dismantled) when the number of write commands in the write command queue drops below the threshold.

In a number of embodiments, a tree data structure can include a number of nodes. The number of nodes can include start nodes that are associated with a starting logical address of a write command, end nodes that are associated with an ending logical address of a write command, and start/end nodes that are associated with the logical address of a command having a single logical address (e.g. the starting logical address and the ending logical address are the same logical address). The tree data structure can include a start node and an end node or a start/end node for each incoming write command and each command in the active command queue. The active command queue can include write commands that are ready for execution (e.g., logical address overlap has not been detected among the commands in the write command queue). When incoming write commands are received (e.g., by a controller), nodes associated with the incoming write commands can be placed in a tree data structure. In a number of embodiments, overlap between logical addresses of an incoming write command and logical addresses of commands in an active command queue can be detected if a node associated with an incoming write command already exists in a tree data structure. In a number of embodiments, overlap between logical addresses of an incoming write command and logical addresses of commands in an active command queue can be detected by comparing a node associated with the starting logical address of the incoming write command to the in-numerical-order predecessor node in the tree data structure, comparing the node associated with the starting logical address of the incoming write command to the in-numerical-order successor node in the tree data structure, and comparing a node associated with the ending logical address of the incoming write command to the in-numerical-order successor node in the tree data structure. The in-numerical-order predecessor node of the node associated with the starting logical address of the incoming write command is the node associated with the logical address in the tree data structure numerically closest to the starting logical address of the incoming write command having a value less than the start node. The in-numerical-order successor node of the node associated with the starting logical address of the incoming write command is the node associated with the logical address in the tree data structure numerically closest to the starting logical address of the incoming write command having a value greater than the start node. The in-numerical-order successor node of the node associated with the ending logical address of the incoming write command is the node associated with the logical address in the tree data structure numerically closest to the ending logical address of the incoming write command having a value greater than the end node. If the in-numerical-order predecessor node of the node associated with the starting logical address of the incoming write command is an end node or a start/end node, the in-numerical-order successor node of the node associated with the starting logical address of the incoming write command is the node associated with the ending logical address of the incoming write command, and the in-numerical-order successor node of the node associated with the ending logical address of the incoming write command is a start node or a start/end node, then overlap is not detected. If the in-numerical-order predecessor node of the node associated with the starting logical address of the incoming write command is a start node, the in-numerical-order successor node of the of the node associated with the starting logical address of the incoming write command is not the node associated with the ending logical address of the incoming write command, and/or the in-numerical-order successor node of the node associated with to the ending logical address of the incoming write command is an end node, then overlap is detected. In a number of embodiments, if logical address overlap between an incoming write command and commands in the write command queue is detected, then the nodes associated with the incoming write command can be removed from the tree data structure.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, "a number of" something can refer to one or more such things. For example, a number of memory cells can refer to one or more memory cells. Additionally, the designators, such as "M" and/or "N" for example, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 230 may reference element "30" in FIG. 2A, and a similar element may be referenced as 230 in FIG. 2C. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

FIG. 1 is a block diagram of an apparatus in the form of a computing system 100 including at least one memory system 104 in accordance with a number of embodiments of the present disclosure. As used herein, a memory system 104, a controller 108, or a memory device 110 might also be separately considered an "apparatus." The memory system 104 can be a solid state drive (SSD), for instance, and can include a host (e.g., physical) interface 106, a controller 108 (e.g., a processor and/or other control circuitry), and a number of memory devices 110-1, . . . , 110-N (e.g., solid state memory devices such as NAND Flash devices), which provide a storage volume for the memory system 104.

As illustrated in FIG. 1, the controller 108 can be coupled to the host interface 106 and to the memory devices 110-1, . . . , 110-N via a plurality of channels and can be used to transfer data between the memory system 104 and a host 102. The interface 106 can be in the form of a standardized interface. For example, when the memory system 104 is used for data storage in a computing system 100, the interface 106 can be a serial advanced technology attachment (SATA), peripheral component interconnect express (PCIe), or a universal serial bus (USB), among other connectors and interfaces. In general, however, interface 106 can provide an interface for passing control, address, data, and other signals between the memory system 104 and a host 102 having compatible receptors for the interface 106.

Host 102 can be a host system such as a personal laptop computer, a desktop computer, a digital camera, a mobile telephone, or a memory card reader, among various other types of hosts. Host 102 can include a system motherboard and/or backplane and can include a number of memory access devices (e.g., a number of processors).

The controller 108 can communicate with the memory devices 110-1, . . . , 110-N to control data read, write, and erase operations, among other operations. Although not specifically illustrated, in some embodiments, the controller 108 can include a discrete memory channel controller for each channel coupling the controller 108 to the memory devices 110-1, ..., 110-N. The controller 108 can include, for example, a number of components in the form of hardware and/or firmware (e.g., one or more integrated circuits) and/or software for controlling access to the number of memory devices 110-1, ..., 110-N and/or for facilitating data transfer between the host 102 and memory devices 110-1, ..., 110-N.

As illustrated in FIG. 1, the memory system 104 can include command memory 114. The command memory 114 can be used to store commands in queues (e.g., buffers). In this example, command memory includes a pending command queue 118 and an active command queue 120. The controller 108 can receive incoming commands 112. The incoming commands 112 can be received from the host 102. The logical addresses of the incoming commands (e.g., 112) can be checked for overlap with the logical addresses of write commands in the active command queue (e.g., 120) using a tree data structure (e.g., 116). Incoming commands 112 can be associated with nodes that are placed in the tree data structure 116. The tree data structure 116 can be stored, for instance, in volatile and/or non-volatile memory of the memory system 104. A comparison of the nodes in the tree data structure 116 can be made to determine whether to place the incoming commands 112 in the pending command queue 118 or the active command queue 120. If overlap of an incoming command 112 with a command in the active command queue 120 is detected, then the incoming command 112 is placed in the pending command queue 118. When the incoming command 112 is place in the pending command queue 118, nodes associated with the incoming command are removed from the tree data structure. If overlap of an incoming command with a command in the active command queue 120 is not detected, then the incoming command is placed in the active command queue 120. Processing of the commands in the pending command queue 118 can be delayed for a period of time (e.g., until a number of active commands have been executed and removed from the active command queue 120). The commands in the active command queue 120 can be executed in the order in which they are placed in the active command queue 120 (e.g., the order in which they are received by the controller 108).

The memory devices 110-1, ..., 110-N can include a number of arrays of memory cells (e.g., non-volatile memory cells). The arrays can be Flash arrays with a NAND architecture, for example. However, embodiments are not limited to a particular type of memory array or array architecture. The memory cells can be grouped, for instance, into a number of blocks including a number of physical pages. A number of blocks can be included in a plane of memory cells and an array can include a number of planes. As one example, a memory device may be configured to store 8 KB (kilobytes) of user data per page, 128 pages of user data per block, 2048 blocks per plane, and 16 planes per device.

In operation, data can be written to and/or read from memory (e.g., memory devices 110-1, ..., 110-N of system 104) as a page of data, for example. As such, a page of data can be referred to as a data transfer size of the memory system. Data can be transferred to/from a host (e.g., host 102) in data segments referred to as sectors (e.g., host sectors). As such, a sector of data can be referred to as a data transfer size of the host.

Figures 2A, 2B:
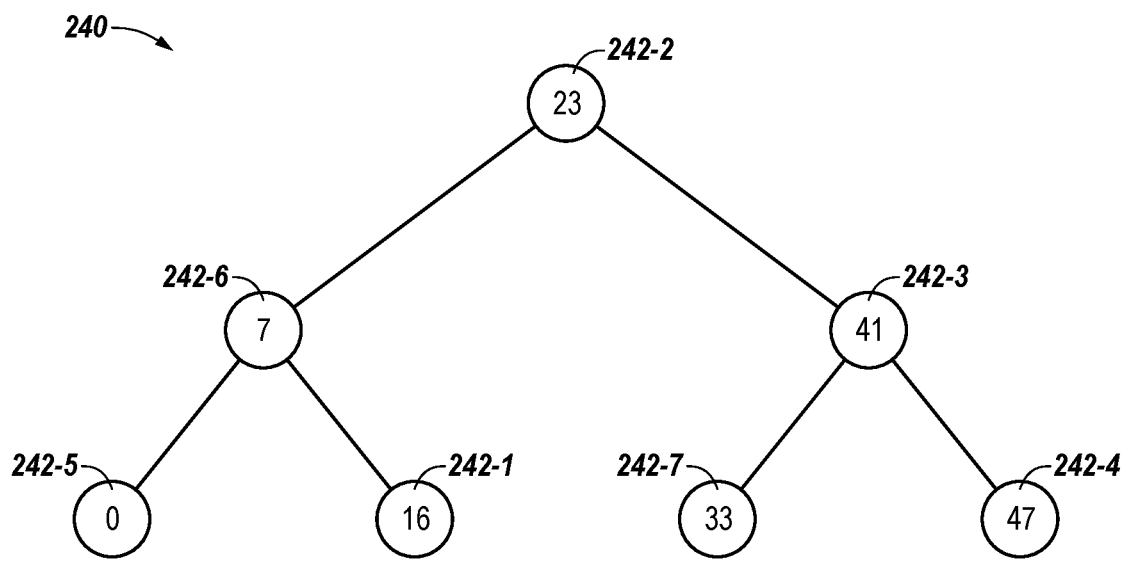
FIGS. 2A-2E illustrate write commands and tree data structures associated with write command overlap detection in accordance with a number of embodiments of the present disclosure.

FIGS. 2A-2E illustrate write commands and tree data structures associated with write command overlap detection in accordance with a number of embodiments of the present disclosure. FIG. 2A illustrates a table representing an active command queue 231 of an apparatus in accordance with a number of embodiments of the present disclosure (e.g., apparatus 100 shown in FIG. 1). Active command queue 231 includes write commands 230 and the logical addresses 232 associated therewith that have been received by a controller (e.g., 108 shown in FIG. 1) and are ready for execution. In this example, active command queue 231 includes command 234-1 (Command 1), associated with logical addresses 16-23, command 234-2 (Command 2), associated with logical addresses 41-47, command 234-3 (Command 3), associated with logical addresses 0-7, and command 234-4 (Command 4), associated with logical address 33. Commands 234-1, 234-2, 234-3, and 234-4 in table 231 are commands that have been identified by the controller as being ready for execution (e.g., the commands do not have overlapping logical addresses). Commands 234-1, 234-2, 234-3, and 234-4 were received in the order listed (e.g., command 234-1 was received first, command 234-2 was received second, command 234-3 was received third, and command 234-4 was received fourth), and are to be executed in the chronological order in which they were received. The commands in active command queue 231 can be associated with nodes in a tree data structure, which will be described below and can be used to detect overlap between logical addresses of subsequent incoming commands and the logical addresses of the commands present in the active command queue 231.

FIG. 2B illustrates tree data structure 240 having nodes associated with the commands in active command queue 231 of FIG. 2A. In a number of embodiments and as illustrated in FIG. 2B, the tree data structure 240 can be a binary tree 240. The binary tree can be balanced each time a new node is placed in the tree (e.g., the nodes can be arranged so that the height of any node in the binary tree does not differ from the height of any other node in the binary tree by more than a threshold number, such as 1, for example, wherein the height of a node is the length of the shortest path between the node and the root node). Tree data structure 240 includes nodes 242-1, 242-2, 242-3, 242-4, 242-5, 242-6, and 242-7. Node 242-1 is a start node and is associated with the starting logical address (LA 16) of command 234-1 of the active command queue 231. Node 242-2 is an end node and is associated with the ending logical address (LA 23) of command 1 of the active command queue 231. Node 242-3 is a start node and is associated with the starting logical address (LA 41) of command 2 of the active command queue 231. Node 242-4 is an end node and is associated with the ending logical address (LA 47) of command 2 of the active command queue 231. Node 242-5 is a start node and is associated with the starting logical address (LA 0) of command 3 of the active command queue 231. Node 242-6 is an end node and is associated with the ending logical address (LA 7) of command 3 of the active command queue 231. Node 242-7 is a start/end node and is associated with the single logical address (LA 33) of command 4 of the active command queue 231. In a number of embodiments, commands associated with a single logical address correspond to a single node in the tree data structure. The single node (e.g., 242-7) is a start/end node and can be treated as a start node and/or as an end node when compared to other nodes during overlap detection, as described herein.

In a number of embodiments, tree data structure 240 is created when the number of active commands in the active command queue 231 reaches a threshold number. For example, as illustrated in FIG. 2B, tree data structure 240 includes nodes associated with four commands and can be created when there are four or more commands in the active command queue. Embodiments are not limited to such a threshold and can include a different number of commands as the threshold for determining the point at which the tree data structure is created. In a number of embodiments, the use of tree data structure 240 can be discontinued when the number of commands in the active command queue 231 drops below a threshold number. When the number of commands in the active command queue 231 drops below the threshold for discontinuing use of the tree data structure 240 (e.g., below four commands in this example), the tree data structure 240 can be dismantled and the logical addresses of the commands in the active queue command can be compared to each other using a linear search algorithm, for instance.

Tree data structure 240 in FIG. 2B can be created using nodes associated with the commands that are received by a controller from a host. Commands 234-1, 234-2, and 234-3 can be received by a controller. The logical addresses of commands 234-1, 234-2, and 234-3 can be compared to each other using a linear search to detect overlap of the logical addresses of commands 234-1, 234-2, and 234-3. When the controller receives command 234-4, tree data structure 240 can be created because to the number of commands received by the controller has reached a threshold number, in this example the threshold number is 4 commands. Nodes 242-1, 242-2, 242-3, 242-4, 242-5, 242-6, and 242-7 can be placed in the tree data structure in numerical order (e.g., the nodes are placed in the tree data structure so they are in numerical order moving from left to right in the tree data structure) and the tree data structure can be balanced (e.g., the height of any node in the tree data structure does not differ from the height of any other node in the tree data structure by more than a threshold number, such as 1, for example, wherein the height of a node is the length of the shortest path between the node and the root node), as illustrated in FIG. 2B.

In a number of embodiments, each start node and end node can be compared to the other nodes in the tree data structure to determine if the node already exists in the tree data structure. If the start node and/or the end node already exists in the tree data structure, then overlap is detected between the command associated with the nodes and the other commands associated with nodes in the tree data structure 240. In a number of embodiments, each start node can be compared to its in-numerical-order predecessor node, each start node can be compared to its in-numerical-order successor node, and each end node can be compared to its in-numerical-order successor node. For each pair of nodes associated with a command, if the in-numerical-order predecessor node of the start node is an end node or a start/end node, the in-numerical-order successor node of the start node is the end node associated with the same command as the start node, and the in-numerical-order successor node is a start node or a start/end node, then no overlap is detected between the command associated with the nodes and the other commands associated with nodes in the tree data structure 240. For each pair of nodes associated with a command, if the in-numerical-order predecessor node of the start node is a start node, the in-numerical-order successor node of the start node is not the end node associated with the same command as the start node, and/or the in-numerical-order successor node of the end node is an end node, then overlap is detected between the command associated with the nodes and the other commands associated with nodes in the tree data structure.

For example, overlap detection for command 234-1 can include comparing node 242-1, which is a start node and is associated with the starting logical address (LA 16) of command 234-1, to its in-numerical-order predecessor node (node 242-6). Node 242-6 is an end node, therefore the comparison does not detect overlap between command 234-1 and the command with the closest preceding logical address. Node 242-1 is compared to its in-numerical-order successor node (node 242-2). Node 242-2 is the end node associated with the same command (command 234-1) as start node 242-1, therefore the comparison does not detect overlap between command 234-1 and another command having a node between the start node (node 242-1) and the end node (node 242-2) associated with command 234-1. Node 242-2, which is an end node and is associated with the ending logical address (LA 23) of command 234-1, is compared to its in-numerical-order successor node (node 242-7). Node 242-7 is a start/end node, therefore the comparison does not detect overlap between command 234-1 and the command with the closest succeeding logical address. Based on those three comparisons, the logical addresses associated with command 234-1 do not overlap with the logical addresses associated with the other commands in the active command queue.

Overlap detection for command 234-2 can include comparing node 242-3, which is a start node and is associated with the starting logical address (LA 41) of command 234-2, to its in-numerical-order predecessor node (node 242-7). Node 242-6 is a start/end node, therefore the comparison does not detect overlap between command 234-2 and the command with the closest preceding logical address. Node 242-3 is compared to its in-numerical-order successor node (node 242-4). Node 242-4 is the end node associated with the same command (command 234-2) as start node 242-3, therefore the comparison does not detect overlap between command 234-2 and another command having a node between the start node (node 242-3) and the end node (node 242-4) associated with command 234-2. Node 242-4, which is an end node and is associated with the ending logical address (LA 47) of command 234-2, is compared to its in-numerical-order successor node. There is not an in-numerical-order successor node to compare to because node 242-4 is associated with the highest logical address in the tree data structure, therefore the comparison does not detect overlap associated with command 234-2. Based on those three comparisons, the logical addresses associated with command 234-2 do not overlap with the logical addresses associated with the other commands in the active command queue.

Overlap detection for command 234-3 can include comparing node 242-5, which is a start node and is associated with the starting logical address (LA 0) of command 234-3, to its in-numerical-order predecessor node. An in-numerical-predecessor node does not exist because node 242-5 is associated with LA 0 (e.g., the lowest logical address). Therefore the comparison does not detect overlap associated with command 234-3. Node 242-5 is compared to its in-numerical-order successor node (node 242-6). Node 242-6 is the end node associated with the same command (command 234-3) as start node 242-5, therefore the comparison does not detect overlap between command 234-3 and another command having a node between the start node (node 242-5) and the end node (node 242-6) associated with command 234-3. Node 242-6, which is an end node and is associated with the ending logical address (LA 7) of command 234-3, is compared to its in-numerical-order successor node (node 242-1). Node 242-1 is a start node, therefore the comparison does not detect overlap between command 234-3 and the command with the closest succeeding logical address. Based on those three comparisons, the logical addresses associated with command 234-3 do not overlap with the logical addresses associated with the other commands in the active command queue.

Overlap detection for command 234-4 can include comparing node 242-7, which is a start/end node and is associated with the only logical address (LA 33) of command 234-4, to its in-numerical-order predecessor node, node 242-2. Node 242-2 is an end node, therefore the comparison does not detect overlap between command 234-4 and the command with the closest preceding logical address. Node 242-7, which is a start/end node and is associated with the only logical address (LA 33) of command 234-4, is compared to its in-numerical-order successor node (node 242-3). Node 242-3 is a start node, therefore the comparison does not detect overlap between command 234-4 and the command with the closest succeeding logical address. Based on those two comparisons, the logical addresses associated with command 234-4 do not overlap with the logical addresses associated with the other commands in the active command queue and command 234-4 can be placed in the active command queue.

Figure 2C:
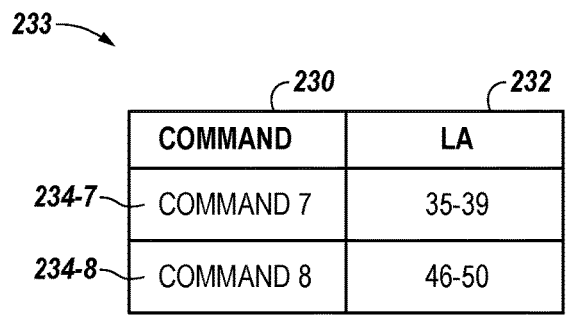

FIG. 2C illustrates a table 233 representing incoming write commands 230 from a host (e.g., host 102) in accordance with a number of embodiments of the present disclosure. Incoming write commands 230 include associated logical addresses 232 and are awaiting a determination regarding potential logical address overlap. The incoming write commands 230 include command 234-7 (Command 7), associated with logical addresses 35-39 and command 234-8 (Command 8), associated with logical addresses 46-50. The logical address of the incoming write commands 230 are associated with nodes in a tree data structure 250, which will be described below, and can be used to detect overlap of logical addresses of incoming commands with the logical addresses of the commands in the active command queue.

Figure 2D:
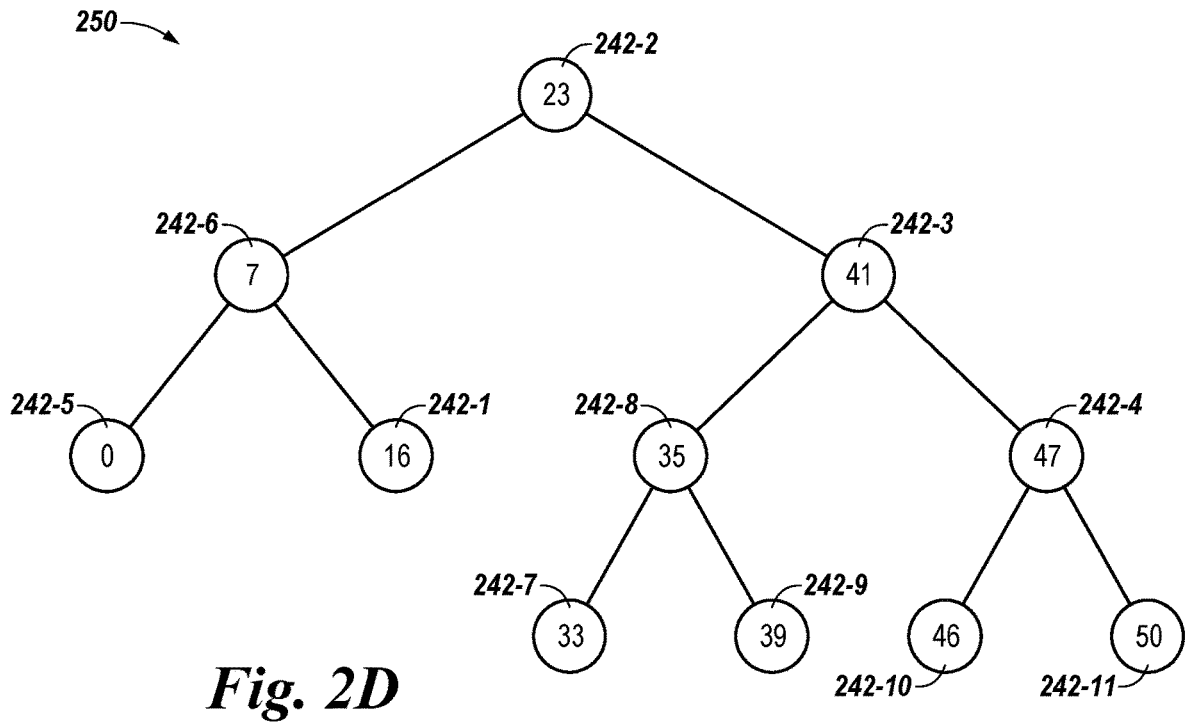

FIG. 2D illustrates tree data structure 250 having nodes associated with the commands in active command queue 231 of FIG. 2A and incoming commands of FIG. 2C. Tree data structure 250 includes nodes 242-1, 242-2, 242-3, 242-4, 242-5, 242-6, 242-7, 242-8, 242-9, 242-10, and 242-11. Nodes 242-1 through 242-7 are associated with the commands in active command queue 231 and were included in tree data structure 240 illustrated in FIG. 2B. Tree data structure 250 includes the nodes illustrated in tree data structure 240 and also nodes 242-8, 242-9, 242-10, and 242-11, which are associated with incoming commands in table 233. Node 242-8 is a start node and is associated with the starting logical address (LA 35) of command 234-7 of the incoming command queue. Node 242-9 is an end node and is associated with the ending logical address (LA 39) of command 234-7 of the incoming command queue. Node 242-10 is a start node and is associated with the starting logical address (LA 46) of command 234-8 of the incoming command queue. Node 242-11 is an end node and is associated with the ending logical address (LA 50) of command 234-8 of the incoming command queue. Nodes 242-8, 242-9, 242-10, and 242-11 can be placed in the tree data structure in numerical order and the tree data structure can be balanced, as illustrated in FIG. 2D.

For the nodes associated with the incoming commands and that were added to the tree data structure (e.g., commands 234-7 and 234-8), each start node can be compared to its in-numerical-order predecessor node and each end node can be compared to its in-numerical-order successor node. For example, overlap detection for command 234-7 can include comparing node 242-8, which is a start node and is associated with the starting logical address (LA 35) of command 234-7, to its in-numerical-order predecessor node (node 242-7). Node 242-7 is a start/end node, therefore the comparison does not detect overlap between command 234-7 and the command with the closest preceding logical address. Node 242-8 is compared to its in-numerical-order successor node (node 242-9). Node 242-9 is the end node associated with the same command (command 234-7) as start node 242-8, therefore the comparison does not detect overlap between command 234-7 and another command having a node between the start node (node 242-8) and the end node (node 242-9) associated with command 234-7. Node 242-9, which is an end node and is associated with the ending logical address (LA 39) of command 23-7, is compared to its in-numerical-order successor node (node 242-3). Node 242-3 is a start node, therefore the comparison does not detect overlap between command 234-7 and the command with the closest succeeding logical address. Based on those three comparisons, the logical addresses associated with command 234-7 do not overlap with the logical addresses associated with the other commands in the active command queue, therefore command 234-7 can be placed in the active command queue.

Overlap detection for command 234-8 can include comparing node 242-10, which is a start node and is associated with the starting logical address (LA 46) of command 234-8, to its in-numerical-order predecessor node (node 242-3). Node 242-3 is a start node, therefore the comparison detects overlap between command 234-8 and command 234-2, the command with the closest preceding logical address. A comparison between node 242-10 and its in-numerical-order successor node (node 242-4) can be made, but is not necessary because overlap between command 234-8 and another command has already been detected. The comparison would detect overlap because the in-numerical-order successor node (node 242-4) is not the end node associated with the same command (command 234-8) as start node 242-10. Also, a comparison between node 242-4, which is an end node and is associated with the ending logical address (LA 47) of command 234-2, and its in-numerical-order successor node can be made, but is not necessary because overlap between command 234-8 and another command has already been detected. Based on those comparisons, the logical addresses associated with command 234-8 overlaps with another command in the active command queue. In one or more embodiments, command 234-8 can be aborted by the controller and an indication can be sent to the host informing the host that command 234-8 has been aborted. The host may resend command 234-8 at a later time. In a number of embodiments, the controller can delay processing of command 234-8 and place command 234-8 in the pending command queue.

Figure 2E:
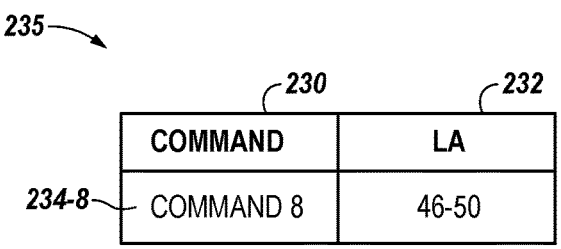

FIG. 2E illustrates a table representing write commands in a pending command queue 235 of an apparatus in accordance with a number of embodiments of the present disclosure. Pending command queue 235 includes write commands 230 and the logical addresses 232 associated with the commands that have been received by a controller and were detected as having logical addresses that overlap with a number of commands in the active command queue 231. Pending command queue 235 includes command 234-8, associated with logical addresses 46-50. Command 234-8 was placed in queue 235 because overlap of the logical addresses of command 234-8 and command 234-2 of the active command queue 231 was detected. The logical addresses of the command in the pending command queue 235 were associated with nodes in tree data structure 250 and were found overlap with logical addresses of a number of commands in the active command queue 231.

Processing of the commands in the pending command queue 235 can be delayed for a time period (e.g., until a number of commands from the active command queue 231 have been executed and removed from the active command queue 231). Nodes associated with the logical addresses of the commands in the pending command queue 235 can be placed in (e.g., added to) the tree data structure 250 after a period of time (e.g., responsive to executing a number of commands in the active command queue). A comparison of the nodes can be made again to determine if the commands in the pending command queue 235 still have logical addresses that overlap with the logical addresses of a number of commands in the active command queue 231. The removal of executed commands from the active command queue 231 can create the possibility that commands in the pending command queue 235 do not overlap with the commands in the active command queue 231. Comparisons of the nodes in the tree data structure 250 can be made to detect overlap, as described above. If overlap of a logical address of a command in the pending command queue 235 is detected, the command remains in the pending command queue 235. If overlap of a logical address of a command in the pending command queue 235 is not detected, the command is removed from the pending command queue 235 and placed in the active command queue 231 (e.g., such that the command is ready for execution). If overlap is detected for a command in the pending command queue more than a threshold number of times, the command can be removed from the pending command queue 235 and the command can be aborted by the controller.

CONCLUSION

The present disclosure includes methods and apparatuses that include write command overlap detection. A number of embodiments include receiving an incoming write command and comparing a logical address of the incoming write command to logical addresses of a number of write commands in a queue using a tree data structure, wherein a starting logical address and/or an ending logical address of the incoming write command and a starting logical address and/or an ending logical address of each of the number of write commands are associated with nodes in the tree data structure.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for write command overlap detection in a memory system, comprising:
    creating an active command queue tree data structure comprising a number of nodes, each of the number of nodes being associated with a starting logical address and/or an ending logical address of a write command in a queue of write commands, wherein the active command queue tree data structure is created in response to two or more write commands being in the queue;
    placing a node associated with a starting logical address and/or an ending logical address of an incoming write command in the active command queue tree data structure;
    determining if a logical address of the incoming write command overlaps with a logical address of a write command in the queue of write commands by comparing the nodes in the active command queue tree data structure, wherein comparing the nodes in the active command queue tree data structure includes:
        comparing the node associated with the starting logical address of the incoming write command to an in-numerical-order predecessor node in the active command queue tree data structure;
        comparing the node associated with the starting logical address of the incoming write command to an in-numerical-order successor node in the active command queue tree data structure; and
        comparing the node associated with the ending logical address of the incoming write command to an in-numerical-order successor node in the active command queue tree data structure;
    removing the previously-placed node associated with the starting logical address and/or the ending logical address of the incoming write command from the active command queue tree data structure and placing the incoming write command in a pending command queue in response to the logical address of the incoming write command overlapping with a logical address of a write command in the queue; and
    placing a node in the tree data structure, wherein the node is associated with the starting logical address and/or ending logical address of the write command in the pending command queue, after a period of time.

2. The method of claim 1, including placing the incoming write command in the queue if a logical address of the incoming write command does not overlap with a logical address of a write command in the queue.

3. The method of claim 1, including aborting the incoming write command if a logical address of the incoming write command overlaps with a logical address of a write command in the queue.

4. The method of claim 1, including delaying processing of the incoming write command if a logical address of the incoming write command overlaps with a logical address of a write command in the queue.

5. A method for write command overlap detection in a memory system, comprising:
creating an active command queue tree data structure comprising nodes associated with starting and/or ending logical addresses of each write command of a number of write commands in a queue in response to two or more write commands being in the queue;
placing a node associated with a starting logical address of an incoming write command and a node associated with an ending logical address of an incoming write command in the active command queue tree data structure;
determining if the logical address of the incoming write command overlaps with a logical address of a write command in the queue of write commands, including:
comparing the node associated with the starting logical address of the incoming write command to an in-numerical-order predecessor node in the active command queue tree data structure;
comparing the node associated with the starting logical address of the incoming write command to an in-numerical-order successor node in the active command queue tree data structure;
comparing the node associated with the ending logical address of the incoming write command to an in-numerical-order successor node in the active command queue tree data structure; and
removing the previously-placed node associated with the starting logical address of the incoming write command from the active command queue tree data structure and placing the incoming write command in a pending command queue if the in-numerical-order predecessor node of the node associated with the starting logical address of the incoming write command is a start node; and
placing a node in the tree data structure, wherein the node is associated with the starting logical address and/or ending logical address of the write command in the pending command queue, after a period of time.

6. The method of claim 5, including placing the incoming write command in the queue if the in-numerical-order predecessor node of the node associated with the starting logical address of the incoming write command is an end node or a start/end node, the in-numerical-order successor node of the node associated with the starting logical address of the incoming write command is the node associated with the ending logical address of the incoming write command, and the in-numerical-order successor node of the node associated with the ending logical address of the incoming write command is a start node or a start/end node.

7. The method of claim 5, including aborting the incoming write command if the in-numerical-order predecessor node of the node associated with the starting logical address of the incoming write command is a start node, the in-numerical-order successor node of the node associated with the starting logical address of the incoming write command is not the node associated with the ending logical address of the incoming write command, and/or the in-numerical-order successor node of the node associated with the ending logical address of the incoming write command is an end node.

8. The method of claim 5, including delaying processing of the incoming write command if the in-numerical-order predecessor node of the node associated with the starting logical address of the incoming write command is a start node, the in-numerical-order successor node of the node associated with the starting logical address of the incoming write command is not the node associated with the ending logical address of the incoming write command, and/or the in-numerical-order successor node of the node associated with the ending logical address of the incoming write command is an end node.

9. The method of claim 8, including removing the node associated with the starting logical address of the incoming write command and the node associated with the ending logical address of the incoming write command from the active command queue tree data structure if processing of the incoming write command is delayed.

10. The method of claim 5, wherein a number of the nodes associated with starting and/or ending logical addresses comprise a node that is associated with a logical address of a write command in the queue having a single logical address.

11. The method of claim 5, wherein the method includes discontinuing use of the active command queue tree data structure if the number of write commands in the queue drops below a threshold.

12. The method of claim 5, including executing write commands in the queue in an order in which they were placed in the queue removing the executed commands from the queue.

13. An apparatus, comprising:
an array of memory cells; and
a controller operably coupled to the array and configured to:
create an active command queue tree data structure comprising a first number of nodes associated with a starting logical address and/or an ending logical address of each write command in a queue of write commands, and a second number of nodes associated with a starting logical address and/or an ending logical address of an incoming write command, wherein the active command queue tree data structure is created in response to the number of write commands in the queue reaching a first threshold number;
compare the second number of nodes to the first number of nodes to determine if a logical address of the incoming write command overlaps with a logical address of a write command in the queue, wherein comparing the second number of nodes to the first number of nodes includes:
comparing a node of the second number of nodes that is associated with the starting logical address of the incoming write command to a node of the first number of nodes that is associated with an in-numerical-order predecessor node in the active command queue tree data structure;
comparing the node of the second number of nodes that is associated with the starting logical address of the incoming write command to a node of the first number of nodes that is associated with an in-numerical-order successor node in the active command queue tree data structure;
comparing a node of the second number of nodes that is associated with the ending logical address of the incoming write command to a node of the first number of nodes that is associated with an in-numerical-order successor node in the active command queue tree data structure;
remove the second number of nodes from the active command queue tree data structure and place the incoming write command in a pending command queue in response to the logical address of the incoming write command overlapping with the logical address of the write command in the queue; and place a node in the tree data structure, wherein the node is associated with the starting logical address and/or ending logical address of the write command in the pending command queue, after a period of time.

14. The apparatus of claim 13, wherein the controller is configured to abort the incoming write command if the logical address of the incoming write command overlaps with the logical address of the write command in the queue and wherein the controller is configured to resend the aborted incoming write command at a later time.

15. The apparatus of claim 13, wherein the array of memory cells comprises a number of memory devices.

16. The apparatus of claim 13, wherein the controller is configured to delay processing of the incoming write command if the logical address of the incoming write command overlaps with the logical address of the write command in the queue, and wherein the controller is configured to place the incoming write command in the queue responsive to executing a number of the write commands in the queue.

17. The apparatus of claim 16, wherein the controller is configured to place the incoming write command in the queue if a logical address of the incoming write command no longer overlaps with a logical address of a write command in the queue.

18. The apparatus of claim 13, wherein the controller is configured to:

execute a number of the write commands in the queue in an order in which they were placed in the queue; and place the incoming write command in the queue responsive to executing the number of write commands.

19. The apparatus of claim 13, wherein the controller is configured to create the active command queue tree data structure in response to two or more write commands being in the queue.

20. The apparatus of claim 13, wherein the controller is configured to discontinue use of the active command queue tree data structure in response to the number write of commands in the queue reaching a second threshold number.

* * * * *